United States Patent [19]

Cloyd

[11] 4,056,865
[45] Nov. 8, 1977

[54] POULTRY TRUSSING RETAINER

[75] Inventor: John Keen Cloyd, Turlock, Calif.

[73] Assignee: Volk & Son Manufacturing Co., Inc., Turlock, Calif.

[21] Appl. No.: 749,217

[22] Filed: Dec. 10, 1976

[51] Int. Cl.$^2$ ............................................. A22C 21/00
[52] U.S. Cl. ........................................ 17/1 S; 17/44.1
[58] Field of Search .................. 17/1 S, 11, 44.1, 44.3

[56] References Cited

U.S. PATENT DOCUMENTS

| 1,633,499 | 6/1927 | Seldien | 17/1 S |
|---|---|---|---|
| 2,189,421 | 2/1940 | Huschka | 17/1 S |
| 2,583,913 | 1/1952 | Weiterschan | 17/1 S |
| 2,722,712 | 11/1955 | Rabe | 17/1 S |
| 2,981,972 | 5/1961 | Zebarth | 17/44.1 |
| 3,112,515 | 12/1963 | Volk | 17/1 S |
| 3,201,824 | 8/1965 | Konopa | 17/11 |
| 3,213,487 | 10/1965 | Reynolds | 17/11 |
| 3,474,489 | 10/1969 | Kliewer et al. | 17/11 |
| 3,895,415 | 7/1975 | Volk | 17/1 S |

Primary Examiner—Jay N. Eskovitz
Assistant Examiner—Paul J. Hirsch

[57] ABSTRACT

A poultry trussing retainer, made of plastic, is disclosed having a pair of arms and an interconnecting flap, each arm having an outwardly-extending finger for grasping the bone structure of the poultry carcass. The flap is rotatable relative to the arms so that the tail of the carcass may be tucked between the arms. The arms and flap define a pair of tapered sockets that receive and secure the hocks of the poultry such that the greater the force exerted on the hock in a direction away from the retainer, the greater the resistance offered by the retainer.

11 Claims, 9 Drawing Figures

POULTRY TRUSSING RETAINER

This invention relates in general to the poultry industry and in particular to the processing of dressed poultry, such as turkeys, for the retail market.

The present invention is an improvement over the trussing devices shown in U.S. Pat. Nos. 3,112,515, dated Dec. 3, 1963, and 895,415, dated July 22, 1975. These prior art trussing devices are relatively complex configurations, requiring rather sophisticated machinery to bend the wire into a complex three-dimensional form in the case of U.S. Pat. No. 3,112,515; and a rather complex configuration manufactured by injection molding in the case of U.S. Pat. No. 3,895,415.

In contrast to these prior art devices, the present invention relates to a retainer of exceedingly simple design.

The retainer which is the subject of this invention furthermore incorporates the feature of tapered sockets described in detail below which have the effect of creating greater resistance in response to greater forces which may tend to dislodge the trussed poultry hocks from the retainer.

A primary object of the invention is to provide a retainer of simple design which can be manufactured inexpensively.

A further object of the invention is to provide a retainer which offers increasingly greater resistance to increasingly greater forces tending to dislodge trussed hocks from the retainer.

Another object of the invention is to provide a retainer which is usable for a relatively wide range of physical sizes of poultry carcasses to be trussed.

Further objects and advantages of the invention will become apparent from the following descriptions of a preferred embodiment and the drawings, wherein.

Figure 5:
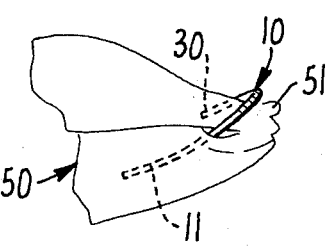
Figure 4:
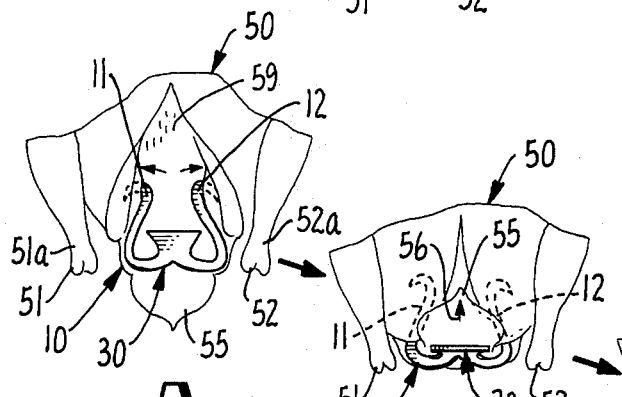
Figure 4:
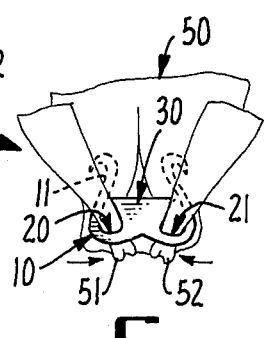
Figure 4:
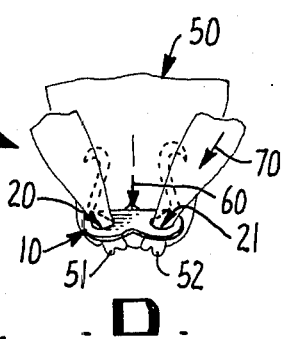
Figure 6:
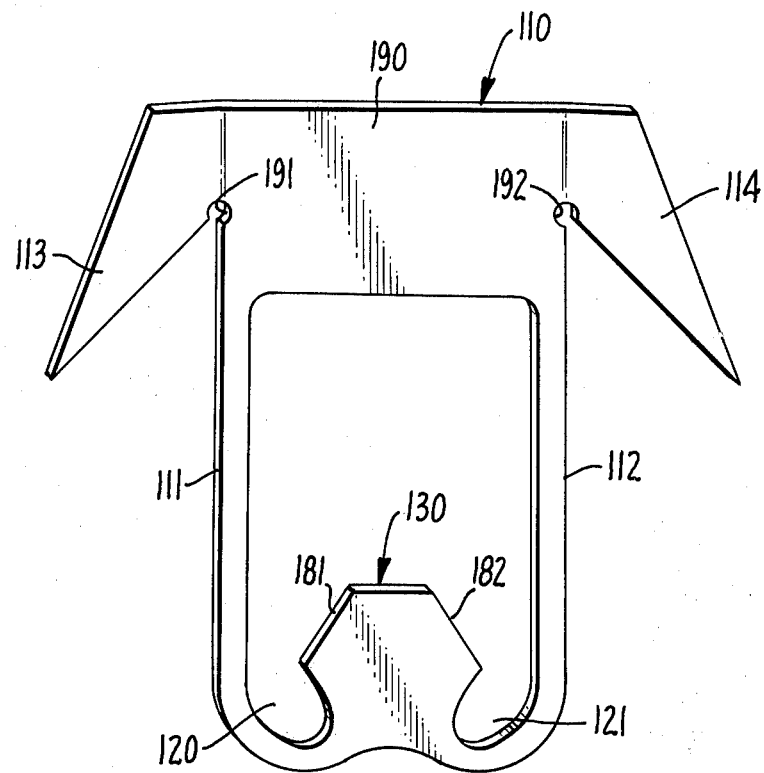

FIGS. 4A, B, C and D show the steps involved in applying the retainer to a turkey carcass;

FIG. 5 is a side elevational view showing a turkey carcass trussed by the retainer; and FIG. 6 is a perspective view of another embodiment of the invention.

Figure 1:
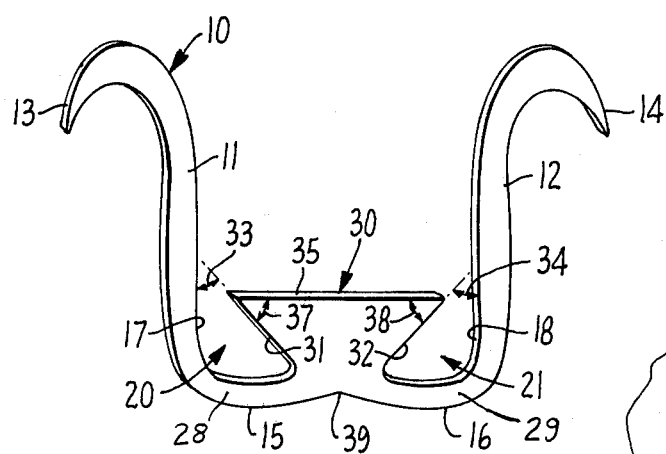
FIG. 1 is a perspective view of the improved retainer.

Referring to the drawings, FIG. 1 shows the retainer 10. A flat, plastic member is formed by arms 11 and 12 joined at one end by an interconnecting flap 30. Arms 11 and 12 each have at their other ends outwardly-extending fingers 13 and 14 respectively for grasping the bone structure in the kidney cavities of the poultry carcass as shown in FIGS. 4A – D.

Flap 30 is resilient and rotatable relative to arms 11 and 12. Flap 30 may be rotated at least 90° in either direction about the axis described by a line connecting the lowermost points 15 and 16 of the retainer 10. The rotatability of flap 30 is important for several reasons, including the fact that when the flap is rotated as shown in FIG. 4B, the tail 55 of the turkey 50 may be tucked between arms 11 and 12.

Referring to FIG. 1, a pair of tapered sockets 20 and 21 are defined by sides 31 and 32 of flap 30 and sides 17 and 18 of arms 11 and 12. Side 17 of arm 11 and side 31 of flap 30 are tapered in the upward direction and converge in the upward direction to form an angle 33. Similarly, side 18 of arm 12 and side 32 of flap 30 are tapered in the upward direction and converge in the upward direction to form angle 34. Angles 33 and 34 represent the taper of sockets 20 and 21 respectively and are between 15° and 45°. In the preferred embodiment, shown in FIG. 1, the taper is approximately 30°. Arms 11 and 12 have lateral extensions 28 and 29, respectively, which each connect to sides 31 and 32 of flap 30 at an acute angle.

Flap 30 is trapezoidal in shape with a free end 35 extending between and intermediate arms 11 and 12. Free end 35 describes a straight edge and forms acute angles 37 and 38 with sides 31 and 32 respectively. Angles 37 and 38 may be 45° to 70°. In the preferred embodiment shown, angles 37 and 38 are 60°.

Flap 30 has an end 39 connected to arms 11 and 12 which defines a concave edge relative to free end 35 of flap 30. This enhances the rotatability of flap 30 in either direction about the axis formed by a line connecting points 15 and 16.

Figure 2:
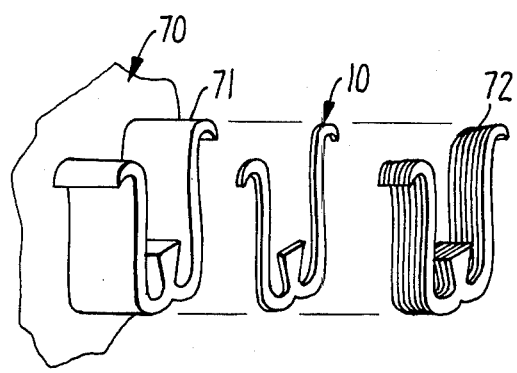
FIG. 2 is a schematic representation of the extruding process by which the improved retainer may be manufactured.

Referring to FIG. 2, retainer 10 may be produced by extrusion wherein an extrusion die shown generally as 70 has plastic material 71 extruded therethrough, which is cut or sheared into individual retainers as shown schematically at 72.

Figure 3:
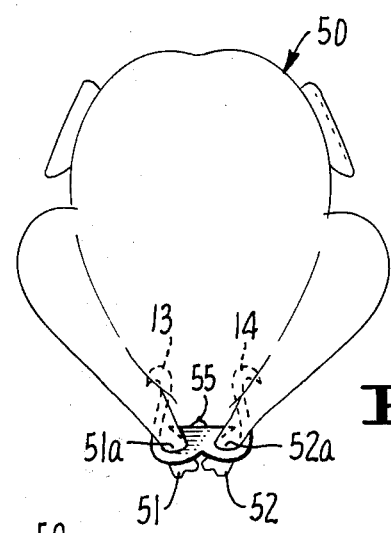
FIG. 3 is a top elevational view showing a turkey carcass trussed by the retainer.

FIG. 3 shows a turkey carcass 50 trussed by retainer 10. Fingers 13 and 14 grasp the bone structure near that portion of the backbone of the fowl near the tail. Hocks 51a and 52a are securely held in position adjacent the tail 55. As used herein, the term "hock" refers to the ankle regions shown by reference numerals 51a and 52a. Exposed knuckles are shown by reference numerals 51 and 52.

FIGS. 4A – D illustrate the operation of retainer 10. In FIG. 4A, which represents the first step in the application of retainer 10 to the turkey carcass 50, arms 11 and 12 are inserted into the cavity 59 of the eviscerated carcass 50. Fingers 13 and 14 are placed adjacent the backbone of the turkey carcass near the tail and grasp the bone structure on either side of the backbone.

Referring to FIG. 4B, flap 30 is rotated approximately 90° in a direction upwardly out of the surface of the drawing and tail 55 is tucked upwardly between arms 11 and 12 in the direction shown by arrow 56.

Referring to FIG. 4C, the third step involves placing hocks 51a and 52a into sockets 20 and 21 respectively while flap 30 rotates toward the plane of arms 11 and 12.

The final step in the application of retainer 10 is shown in FIG. 4D, wherein flap 30 is pressed downwardly in the direction shown by arrow 60, thereby securing hocks 51a and 52a in tapered sockets 20 and 21. In this position, the sides of sockets 20 and 21 pinch the flesh which surrounds hocks 51a and 52a.

FIG. 5 shows the retainer 10 in place in carcass 50. Flap 30 is above the plane of arms 11 and 12.

In the position shown in FIG. 5, retainer 10 offers increased resistance to increased force along the direction of arrow 70 in FIG. 4D in two ways: First, hock 52a will be drawn in the direction of the narrower portion of tapered socket 21 (shown best in FIG. 1); and second, flap 30 as shown in FIG. 5 tends to rotate toward the plane of arms 11 and 12, further decreasing the distance between side 31 of flap 30 and side 17 of arm 11, thereby further tightening the grip on hock 51a by socket 20. This same feature is provided by socket 21 as well.

An alternate embodiment is shown in FIG. 6. The last two digits of each reference numeral pertain to similar features of the embodiment shown in FIG. 1. Brace 190 extends fingers 113 and 114 and strengthens that portion of the retainer that extends into the carcass. Fingers 113 and 114 are rotated about the axes of arms 111 and 112 to facilitate insertion of the retainer into the carcass. Stress relief recesses 191 and 192 are cut at the intersections of arms 111 and 112 with fingers 113 and 114 respectively.

The embodiment shown in FIGS. 1 through 5 may have a brace which extends between arms 11 and 12 similar to brace 190 shown in FIG. 6. Although such a brace is not required for the retainer shown in FIGS. 1 – 5, it is useful in some applications.

I claim:

1. A dressed poultry trussing retainer comprising:
a pair of arms, joined at one end by an interconnecting flap, each arm having at its other end an outwardly-extending finger for grasping the bone structure of the poultry carcass,
said flap being resilient and rotatable relative to said arms so that the tail of the poultry may be tucked between said arms,
said arms and flap defining a pair of sockets that receive and secure the exposed hocks of the poultry, whereby said fingers grasp the bone structure of the poultry carcass while said sockets receive and retain the hocks.

2. The retainer of claim 1 wherein said sockets are defined by convergent sides of said flap and arms.

3. The retainer of claim 2 wherein said sockets have a taper between 15° and 45°.

4. The retainer of claim 1 wherein said pair of arms each has a lateral extension connecting to said flap at an acute angle.

5. The retainer of claim 1 further comprising a brace extending between said fingers.

6. The retainer of claim 1 wherein said flap has a substantially trapezoidal shape with a free end extending between and intermediate said arms and a pair of sides forming acute angles with said free end.

7. The retainer of claim 4 wherein said flap has an end connected to said arms defined by an edge concave relative to said free end, whereby the rotatability of said flap is enhanced.

8. A dressed poultry trussing retainer comprising:
a flat, resilient, plastic member having a pair of arms joined at one end by an interconnecting flap, each arm having at its other end an outwardly-extending finger for grasping the bone structure of the poultry carcass,
said flap being rotatable relative to said arms so that the tail of the poultry may be tucked between said arms,
said arms and flap defining a pair of tapered sockets for receiving and securing the exposed hocks of the poultry such that as a force is exerted on either of said hocks, said hock is drawn into a narrower portion of said tapered socket, whereby the greater the force exerted on said hock, the greater the resistance offered by the retainer.

9. The retainer of claim 8 further comprising a brace which extends between said fingers.

10. The retainer of claim 8 wherein said flap has a substantially trapezoidal shape with a free end extending between and intermediate said arms and a pair of sides forming acute angles with said free end.

11. The retainer of claim 10 wherein said acute angles are between 45° and 70°.

UNITED STATES PATENT OFFICE
CERTIFICATE OF CORRECTION

Patent No. 4,056,865          Dated November 8, 1977

Inventor(s) John Keen Cloyd

It is certified that error appears in the above-identified patent and that said Letters Patent are hereby corrected as shown below:

Column 1, line 8, "895,415" should be "3,895,415".

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*